Patented Mar. 27, 1934

1,952,886

UNITED STATES PATENT OFFICE 1,952,886

PIGMENT

William J. O'Brien, Shaker Heights, Ohio

No Drawing. Application June 14, 1932,
Serial No. 617,252

17 Claims. (Cl. 134—58)

This invention relates to pigments and has among its objects the formation of a pigment which will yield a smooth and fine-grained film or coating when associated with ordinary liquid vehicles and spread as a surface coating.

A further object of this invention is the coating of pigment particles with a protective colloid whereby the properties of the pigment are modified and improved so that the pigment will form a smooth, easy-working paint that is free from agglomerates. The pigments so coated tend to remain in suspension in the paint vehicle for a much longer period of time than pigments not so treated.

Other, further and more specific objects of this invention will become readily apparent to persons skilled in the art from a consideration of the following description.

In the preparation of pigments by the methods heretofore employed, the resulting powdered pigment when incorporated with a vehicle, such as linseed oil or other drying and semi-drying oil, yields a paint surface which frequently is not as smooth and fine-grained as desired, due to the existence of agglomerated particles of the pigment. This agglomeration persists to an undesirable extent despite the grinding of the pigment in oil.

I have found that by adding suitable quantities of certain hydrogenated oils to a suspension of a pigment in water the tendency for the pigment particles to agglomerate is largely diminished, and when the pigment containing these hydrogenated oils is ground in a vehicle as a paint, the paint film produced therefrom is smoother and freer from grains or coarse particles and results in a very smooth paint job. The effects of additions of small quantities of these hydrogenated oils to the pigment may be attributed to a change in the surface tension of the individual particles of pigment by the presence of these hydrogenated oils so that there is no longer any tendency for these particles to collect in clusters or agglomerates. It appears that these hydrogenated oils coat the particles of pigment, acting as protective colloids and change the surface tension of the particles so that they do not agglomerate. Where the pigment is to be used in a paint, the quantity of protective colloid employed in my special process may vary from 0.05% to 1% depending upon the pigment and colloid employed.

The protecting agents which I have found suitable for this purpose are the hydrogenated fish oils (for example, menhaden oil, sardine oil, whale oil), hydrogenated soya bean oils and hydrogenated castor oil.

A specific example of carrying out this invention is as follows: To a warm, wet, slurry of whiting in water there is added about 0.1% hydrogenated fish oil, and the mixture is thoroughly ground, whereupon it is filter-pressed to remove the water, then dried and later ground in dry form. The resulting pigment, after incorporation with a vehicle, with or without a paint thinner, will form a paint which yields a paint film having a highly desirable and very smooth surface and finish. The pigment in this paint will remain suspended longer than pigments not so treated. In this system, the oil of the paint appears to constitute the external phase, the pigment forming the internal phase and the hydrogenated fish oil being the protective colloid.

The hydrogenated fish oil or other suitable protective colloid material may be added either in molten state or as a solution of emulsion in water. I have found a tube mill very satisfactory in producing a thorough incorporation of pigment and protective colloid.

My new process of treating the pigments is to be clearly distinguished from the mere addition of substances such as stearic and oleic acids and certain salts of these acids to paints for the purpose of preventing settling and giving body to the paint. My process is designed for a different purpose; namely, the alteration of the properties of the pigment itself which is brought about preliminary to the grinding of the pigment in oil. Furthermore, where heretofore the oleic and stearic acids and their salts have been added to paints, from 1 to 2% of the total weight of the paint including the vehicle is necessary to accomplish the desired effect in the paint. By my process of treating the pigments a very much smaller quantity of hydrogenated oil will produce the totally different effect in the pigment itself, for usually with hydrogenated oil equal to 0.1% of the weight of the dry pigment I am able to cover the pigment with the requisite amount of protective colloid or deflocculating agent to yield a pigment possessing the new modified properties.

My process finds suitable application for the treatment of other pigments besides whiting, examples of some other pigments being carbon black or other finely divided carbon pigment, titanium oxides, white lead, lithopone, iron reds, zinc oxide, blanc fixe, ground barytes, etc.

I have also found that the beneficial effects of coating the pigments as above described also exist where the pigment so treated is used for purposes other than in paints; for example, as fillers in plastic compositions, rubber compositions and molded products. Where the pigments are to be used in compositions that do not have oils or similar liquid vehicles as their components, the quantity of protective colloid coating or agent may be increased to as much as 5% of the weight of pigment for most uses and to as much as 15% for special purposes.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A dry pigment in finely divided form and having a protective colloid coating of a hydrogenated substance of the group consisting of oils derived from marine animals and vegetable material upon the individual particles of the pigment for preventing agglomeration of the pigment particles, said hydrogenated substance being from 0.05% to 15% of the weight of pigment.

2. A dry pigment in finely divided form and having a protective colloid coating of a hydrogenated substance of the group consisting of oils derived from marine animal and vegetable material upon the individual particles of the pigment for preventing agglomeration of the pigment particles, said hydrogenated substance being from 0.05% to 1% of the weight of pigment.

3. A dry pigment in finely divided form and having a protective colloid coating of a hydrogenated substance of the group consisting of fish oil, soya bean oil and castor oil upon the individual particles of the pigment for preventing agglomeration of the pigment particles, said hydrogenated oil being from 0.05% to 15% of the weight of pigment.

4. A dry pigment in finely divided form and having a protective colloid coating of a hydrogenated substance of the group consisting of fish oil, soya bean oil and castor oil upon the individual particles of the pigment for preventing agglomeration of the pigment particles, said hydrogenated oil being from 0.05% to 5% of the weight of pigment.

5. A dry pigment in finely divided form and having a protective colloid coating of a hydrogenated substance of the group consisting of fish oil, soya bean oil and castor oil upon the individual particles of the pigment for preventing agglomeration of the pigment particles, said hydrogenated oil being from 0.05% to 1% of the weight of pigment.

6. A dry pigment in finely divided form and having a protective colloid coating of a hydrogenated fish oil upon the individual particles of the pigment for preventing agglomeration of the pigment particles, said hydrogenated oil being from 0.05% to 1% of the weight of pigment.

7. A dry pigment in finely divided form and having a protective colloid coating of a hydrogenated soya bean oil upon the individual particles of the pigment for preventing agglomeration of the pigment particles, said hydrogenated oil being from 0.05% to 1% of the weight of pigment.

8. A dry pigment in finely divided form and having a protective colloid coating of hydrogenated castor oil upon the individual particles of the pigment for preventing agglomeration of the pigment particles, said hydrogenated oil being from 0.05% to 1% of the weight of pigment.

9. A dry pigment comprising whiting in finely divided form and having a protective colloid coating of hydrogenated fish oil upon the individual particles of the whiting for preventing agglomeration of the whiting particles, said hydrogenated oil being from 0.05% to 15% of the weight of whiting.

10. A dry pigment comprising zinc oxide in finely divided form and having a protective colloid coating of hydrogenated fish oil upon the individual particles of the zinc oxide for preventing agglomeration of the zinc oxide particles, said hydrogenated oil being from 0.05% to 15% of the weight of zinc oxide.

11. A dry pigment comprising a carbon pigment in finely divided form and having a protective colloid coating of hydrogenated fish oil upon the individual particles of the carbon pigment for preventing agglomeration of the carbon pigment particles, said hydrogenated oil being from 0.05% to 15% of the weight of carbon pigment.

12. A dry pigment comprising whiting in finely divided form and having a protective colloid coating of hydrogenated soya bean oil upon the individual particles of the whiting for preventing agglomeration of the whiting particles, said hydrogenated oil being from 0.05% to 15% of the weight of whiting.

13. A dry pigment comprising zinc oxide in finely divided form and having a protective colloid coating of hydrogenated soya bean oil upon the individual particles of the zinc oxide for preventing agglomeration of the zinc oxide particles, said hydrogenated oil being from 0.05% to 15% of the weight of zinc oxide.

14. A dry pigment comprising a carbon pigment in finely divided form and having a protective colloid coating of hydrogenated soya bean oil upon the individual particles of the carbon pigment for preventing agglomeration of the carbon pigment particles, said hydrogenated oil being 0.05% to 15% of the weight of carbon pigment.

15. A dry pigment comprising whiting in finely divided form and having a protective colloid coating of hydrogenated castor oil upon the individual particles of the whiting for preventing agglomeration of the whiting particles, said hydrogenated oil being from 0.05% to 15% of the weight of whiting.

16. A dry pigment comprising zinc oxide in finely divided form and having a protective colloid coating of hydrogenated castor oil upon the individual particles of the zinc oxide for preventing agglomeration of the zinc oxide particles, said hydrogenated oil being from 0.05% to 15% of the weight of zinc oxide.

17. A dry pigment comprising a carbon pigment in finely divided form and having a protective colloid coating of hydrogenated castor oil upon the individual particles of the carbon pigment for preventing agglomeration of the carbon pigment particles, said hydrogenated oil being from 0.05% to 15% of the weight of carbon pigment.

WILLIAM J. O'BRIEN.